United States Patent

[11] 3,620,593

| [72] | Inventor | Robert B. Tackaberry<br>Williamsville, N.Y. |
|------|----------|---------------------------------------------|
| [21] | Appl. No. | 7,918 |
| [22] | Filed | Feb. 2, 1970 |
| [45] | Patented | Nov. 16, 1971 |
| [73] | Assignee | American Optical Corporation<br>Southbridge, Mass. |

[54] METHOD OF SURFACE INTERFERENCE MICROSCOPY
3 Claims, 1 Drawing Fig.

| [52] | U.S. Cl. | 350/12, 350/14, 350/152, 350/157, 356/106 R, 356/118 |
|------|----------|---|
| [51] | Int. Cl. | G02b 27/28 |
| [50] | Field of Search | 350/152, 157, 166, 169–174, 12–15; 356/118, 106 |

[56] References Cited
UNITED STATES PATENTS

| 2,601,175 | 6/1952 | Smith | 350/12 |
| 2,944,463 | 7/1960 | Rantsch | 350/157 X |
| 3,454,340 | 7/1969 | Nomarski | 350/13 X |
| 3,497,283 | 2/1970 | Law | 350/157 X |

Primary Examiner—David Schonberg
Assistant Examiner—Paul R. Miller
Attorneys—William C. Nealon, Noble S. Williams and Robert J. Bird ABSTRACT: An incident beam of natural light is divided into two beams of linear polarized light, their polarizations being mutually perpendicular. One beam is directed to a specimen surface and the other to a reference surface. Upon reflection from their respective surfaces, the beams are recombined and analyzed. The resultant of this recombined beam is a linear polarized beam having a certain orientation which is a function of the difference in optical path of the two beams. This optical path difference relates to the magnitude of imperfections of the specimen surface under observation.

● THIS COMPONENT REFLECTS AT BEAM DIVIDER

↕ THIS COMPONENT TRANSMITS AT BEAM DIVIDER

PATENTED NOV 16 1971 3,620,593
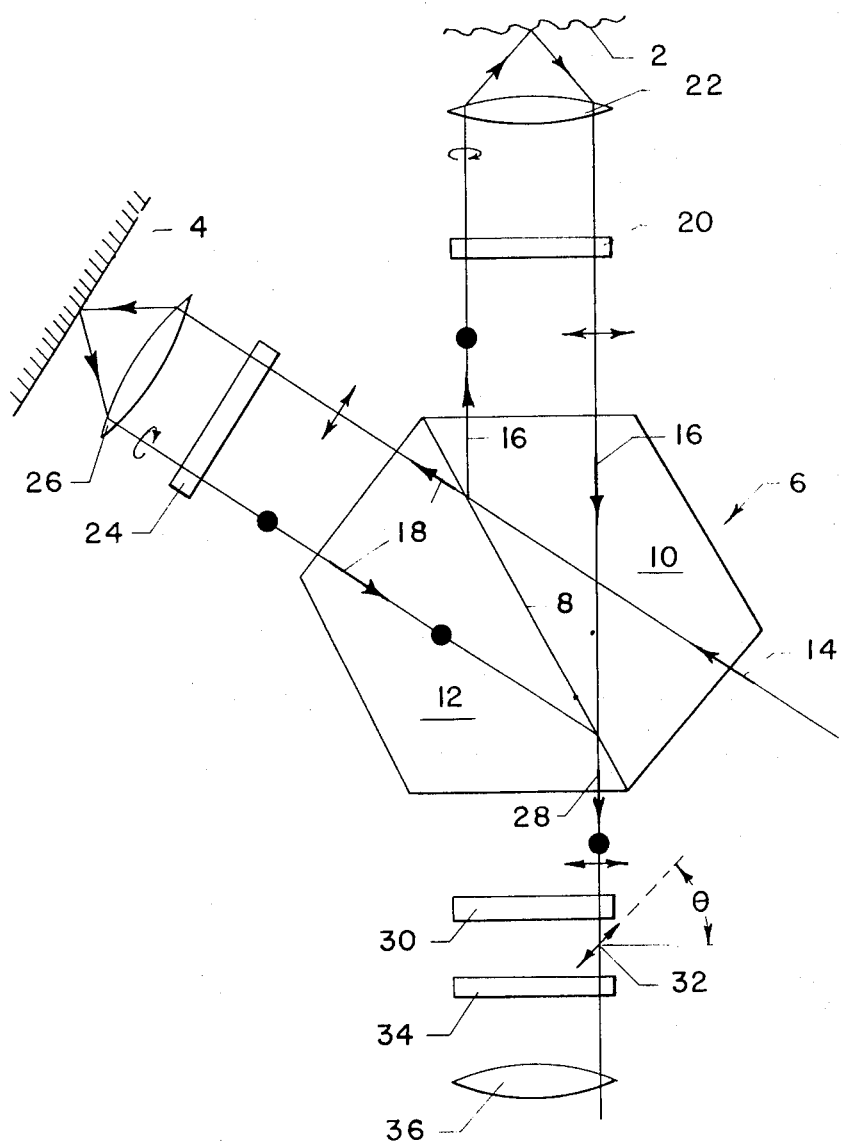
● THIS COMPONENT REFLECTS AT BEAM DIVIDER
↕ THIS COMPONENT TRANSMITS AT BEAM DIVIDER
*INVENTOR.*
ROBERT B. TACKABERRY
BY Robert J Bird
ATTORNEY 3,620,593

METHOD OF SURFACE INTERFERENCE MICROSCOPY

BACKGROUND OF THE INVENTION

The present invention is related to surface interference microscopy. Among other uses, interference microscopes are used to examine the surfaces of opaque specimens, such as metal surfaces, to examine their structure and finish.

It is an object of the present invention to provide a method of surface interference microscopy which will enable measurements of surface irregularities to within one-thousandth the wavelength of light.

Other objects, advantages and features of this invention will become apparent from the following description of one embodiment thereof when taken in connection with the accompanying drawing.

DRAWING

The drawing is a schematic of an optical system according to the present invention.

DESCRIPTION

Referring to the drawing, a specimen or surface to be examined is shown at 2 and a reference surface or plano mirror is shown at 4. A beam divider is generally indicated at 6 and is disposed relative to surfaces 2 and 4 so as to accept incident light and to direct the same to the specimen and reference surfaces.

Beam divider 6 includes a birefringent beam divider surface 8 interposed between prism members 10 and 12.

Incident natural light beam 14 is directed into the system. At the beam divider surface 8, beam 14 is partially reflected and partially transmitted. The reflected beam 16 is directed toward the specimen surface and the transmitted beam 18 is directed toward the reference surface. Reflected (or object) beam 16 is linearly polarized, by surface 8, in the plane perpendicular to the drawing, as represented by the large dot. Transmitted (or reference) beam 18 is linearly polarized in the plane of the drawing, as represented by the double-headed arrow. In the path of reflected beam 16, between divider 6 and specimen surface 2, are a quarter-wave retardation plate 20 and an objective 22. Similarly, a quarter-wave retardation plate 24 and an objective 26 are disposed in the path of transmitted beam 18 between the divider 6 and the reference surface 4.

Reflected object beam 16 is converted by quarter-wave plate 20 from linear to circular polarized light. This beam passes through the objective 22 and is reflected from the specimen surface 2 passing again through objective 22. Quarter-wave plate 20 then converts this circular light into linear light polarized in the plane of the drawing, as shown by the double-headed arrow. Being thus polarized, object beam 16 transmits through prism 10, through divider surface 8, and through prism 12.

Transmitted reference beam 18 follows a similar course through quarter-wave plate 24, where it is converted to circular light, and through objective 26 reflecting from reference surface 4 back through objective 26 and again through quarter-wave plate 24. Wave plate 24 converts the circular to linear light polarized perpendicular to the plane of the drawing as represented by the dot. Being thus polarized, beam 18 passes through prism 12 and is reflected from surface 8, where it recombines with beam 16.

The recombined beams 16 and 18 (hereinafter designated 28) leaving prism 12 are linear polarized beams of equal amplitude whose planes of polarization are mutually perpendicular. Recombined beam 28 passes through a quarter-wave retardation plate 30 which converts the mutually perpendicular components of beam 28 into circular polarized beams of opposite rotation. The resultant of this combination is a linear polarized beam whose orientation is a function of the difference in optical path of the components of beam 28. That is, the comparative optical paths of object beam 16 and reference beam 18 result in an orientation of the linear polarized resultant beam leaving quarter-wave plate 30. This orientation varies as the optical path difference varies. The linear polarized resultant beam is indicated by the slanted arrow 32.

An analyzer 34 and an eyepiece 36 are used to observe the orientation (arrow 32) of resultant beam 28. That is, by turning the analyzer to the position of minimum transmittance, the angular orientation 32 of beam 28 can be determined.

This apparatus is very sensitive to minute changes in optical path since every increment of optical path difference of one-quarter wavelength effects a 45° rotation of the beam orientation (or arrow) 32. That is, an observed angular deviation of arrow 32 is proportional to a 45° rotation thereof, as the observed optical path difference is proportional to a quarter wavelength of light. Thus, for example, a one-thousandths wavelength of relative optical path difference will yield a 10.8-minute relative rotation or angular deviation of arrow 32. With the aid of a quartz half-shade eyepiece for an analyzer, the relative angular disposition of arrow 32 in such increments as 10.8 minutes is easily discerned.

The birefringent beam divider 6 is shown as having certain prism shapes enclosing a divider surface therebetween. This beam divider is only by way of example since there are other such dividers known to the art which are capable of accepting natural light and dividing it into separate beams of mutually perpendicularly polarized light.

It may occur to others of ordinary skill in the art to make modifications of the present invention which will lie within its concept and scope and not constitute a departure therefrom. Accordingly, it is intended that the invention be not limited by the details in which it has been described but only by the following claims.

What is claimed is:

1. A surface interference microscope including:
    a polarizing beam divider disposed in the path of incident light, said beam divider directing an object beam of linear polarized light toward a specimen surface and a reference beam of linear polarized light toward a reference surface, the polarizations of said object and reference beams being mutually perpendicular,
    a quarter-wave retardation plate and an objective disposed between said beam divider and said specimen surface in the path of said object beam directed to and reflected from said specimen surface,
    a quarter-wave retardation plate and objective disposed between said beam divider and said reference surface in the path of said reference beam directed to and reflected from said reference surface,
    said beam divider being operative to recombine said reflected object and reference beams,
    a quarter-wave retardation plate, an analyzer, and an eyepiece disposed in the path of said recombined beam,
    said analyzer being rotatable to determine a position at which the rate of change of transmittance therethrough with respect to the angular orientation of said analyzer is zero.

2. A surface interference microscope including:
    a polarizing beam divider disposed in the path of incident light, said beam divider directing an object beam of linear polarized light toward a specimen surface and a reference beam of linear polarized light toward a reference surface, the polarizations of said object and reference beams being mutually perpendicular,
    a quarter-wave retardation plate to convert said object beam from linear to circular polarized light prior to incidence on said specimen surface and to convert said object beam from circular to linear polarized light after reflection from said specimen surface,
    an objective lens disposed in the path of said object beam,
    a quarter-wave retardation plate to convert said reference beam from linear to circular polarized light prior to incidence on said reference surface and to convert said reference beam from circular to linear polarized light after reflection from said reference surface, an objective lens disposed in the path of said reference beam, said reflected object and reference beams being directed to said beam divider to be recombined, a quarter-wave retardation plate disposed in the path of said recombined beam to convert its mutually perpendicular components to circular polarized components, the resultant of said circular polarized components being a linear polarized beam, an analyzer disposed in the path of said recombined beam to measure its orientation, said orientation being a function of the difference in optical path of said object and reference beams, and an eyepiece disposed in the path of said recombined beam.

3. An optical interferometry apparatus including:

a polarizing beam divider disposed in the path of incident light, said beam divider directing an object beam of linear polarized light toward a specimen surface and a reference beam of linear polarized light towards a reference surface, the polarizations of said object and reference beams being mutually perpendicular, a quarter-wave retardation plate to convert said object beam from linear to circular polarized light prior to incidence on said specimen surface and to convert said object beam for circular to linear polarized light after reflection from said specimen surface, a quarter-wave retardation plate to convert said reference beam for linear to circular polarized light prior to incidence on said reference surface and to convert said reference beam for circular to linear polarized light after reflection from said reference surface, said reflected object and reference beams being directed to said beam divider to be recombined, a quarter-wave retardation plate disposed in the path of said recombined beam to convert its mutually perpendicular components to circular polarized components, the resultant of said circular polarized components being a linear polarized beam, and an analyzer disposed in the path of said recombined beam to measure its orientation, said orientation being a function of the difference in optical path of said object and reference beams.

* * * * *